United States Patent Office 3,307,419
Patented Mar. 7, 1967

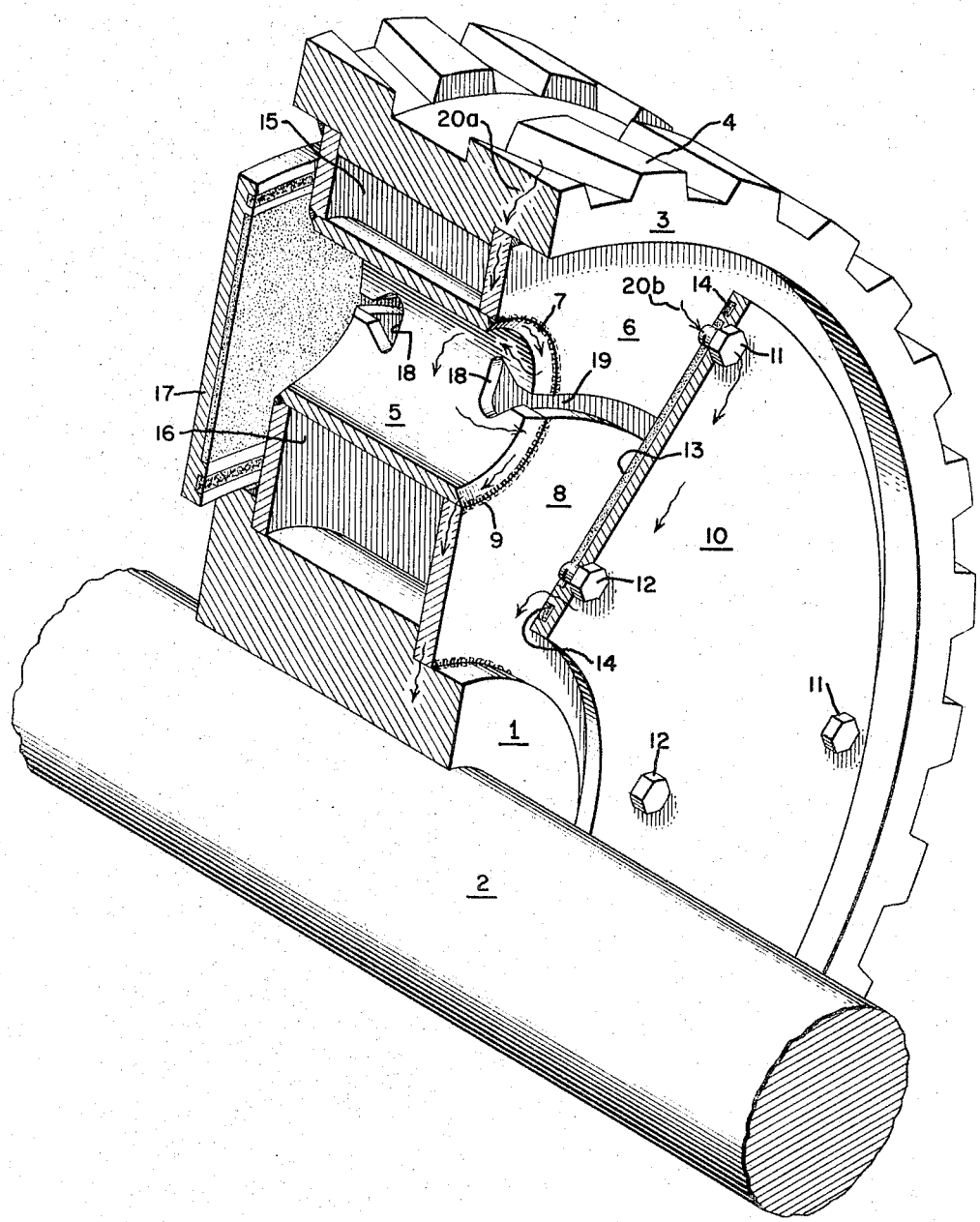
INVENTORS:
SHERMAN P. BRICKETT,
FRANK E. WEEKS,
BY W. C. Crutcher
THEIR ATTORNEY.

3,307,419
QUIET GEAR
Sherman P. Brickett, Hampton Falls, N.H., and Frank E. Weeks, Topsfield, Mass., assignors to General Electric Company, a corporation of New York
Filed Jan. 11, 1965, Ser. No. 424,707
5 Claims. (Cl. 74—443)

ABSTRACT OF THE DISCLOSURE

Gear rim and gear hub are connected by inner and outer radial web plates with an annular gap between plates bridged by sound-attenuating torque-transmitting connectors. Radial damping plates may also bridge the gap between web plates.

---

This invention relates to an improved quiet gear construction for attenuating transmission of sound energy between gear teeth and the gear hub. More particularly, the invention relates to an improved quiet gear construction for a built-up or fabricated gear.

Quiet operation is an important performance characteristic of gears, and in some cases is extremely critical. Gear noise may arise from meshing action of the gear teeth, unbalance, and many other sources, such as non-cylindrical bearings. One of the primary sources of noise arises from periodic impulses produced by meshing of the gear teeth. The vibrations are transmitted from the rim of the gear, through the web to the gear hub, and from there along the shaft, through the bearings to the supporting structure. The energy may be transmitted in the form of longitudinal or transverse mechanical vibrations, which ultimately produce structure-borne and airborne noise.

Quiet gear constructions have been suggested, wherein energy transmission through the web has been reduced by providing a web with overlapping arcuate slots to insure no continuous radial line of metal between gear rim and hub, as disclosed in U.S. Patent 2,380,776 to E. F. Miller or by means of providing a resilient metal torus between radially spaced radial web plates as disclosed in U.S. Patent 2,939,331 to F. E. Weeks. Various suggestions have been made in the prior art for using viscous or elastic damping material in conjunction with fabricated gears or other rotatable members as a substitute for a direct metal connection between hub and rim in attempts to reduce transmission of energy. However, the suggested constructions either result in gears which have reduced torque-carrying abilities or which fail to attenuate some vibration frequency of interest, such as a harmonic of the meshing frequency.

Accordingly, one object of the present invention is to provide an improved quiet gear construction which reduces transmission of many different frequencies of vibrational energy between the rim and hub of the gear.

Another object of the invention is to provide an improved quiet gear utilizing a low cost fabricated web construction which reduces noise transmission in the gear.

Briefly stated, in accordance with the preferred embodiment of the invention, the gear web is comprised of inner and outer circumferential radially separated plates connected to the gear hub and gear rim respectively joined for transmission of torque by means of circumferentially spaced members not in direct radial line with the aforementioned plates. A third steel plate member with damping material bridges the gap between the first two members and provides damping. In the preferred embodiment, there are two sets of inner, outer and damping plate members while the circumferentially spaced members comprise pipe spacers connected at their ends to inner and outer plates.

The organization and operation of the invention, together with further objects and advantages thereof, may best be understood by reference to the following description taken in connection with the accompanying drawing in which the single figure is a partial perspective of a gear having a fabricated web structure employing the invention.

Referring now to the drawing, a gear hub member 1 is arranged to be rotatable with shaft 2. Coaxial with shaft 2 and radially spaced from hub 1 is a cylindrical rim 3 having double helical gear teeth 4 cut therein.

Extending between hub 1 and rim 3 is a fabricated web structure comprising substantially identical right-hand and left-hand sets of radial circular plate members connected by a number of circumferentially spaced cylindrical pipe spacers, such as the one indicated at 5 and broken away through the middle to show its inner construction. The right-hand set of plate members includes an outer radial plate 6 attached at its outer periphery, as by welding, to rim 3, and also attached to the upper half of the end of each pipe spacer 5, as indicated by welds 7. Aligned with the outer plate 6 is an inner radial circular plate 8, which is attached to the lower half of the ends of pipe spacers 5 by welds 9 and also attached to hub 1 at its inner periphery. Plates 6 and 8 are radially spaced from one another around the entire gear by an annular gap 19.

A third radial plate member 10, which is preferably circular, but which could also be segmental, is loosely attached to plate members 6, 8 by circumferentially spaced bolts 11, 12 respectively, so as to bridge gap 19. A layer of visco-elastic damping material 13, such as a commercial epoxy material designated DC-322 and manufactured by Lord Manufacturing Co., is provided in a recess on the inner surface of plate 10 so as to rub against the outer surfaces of plates 6, 8. Suitable sealing rings 14 may be employed in inner and outer peripheral grooves of plate 10 to prevent loss of the damping material or the entry of oil between the plates.

The left-hand set of plate members is constructed substantially identical to the right-hand set and comprises an outer radial plate 15, an inner radial plate 16, and a third radial plate 17 having damping material thereon.

Referring now to the cylindrical spacer members 5, it will be observed that both ends of the spacer member are provided with keyhole-shaped grooves 18 in the vicinity of the gap between inner and outer plate members. The spacer member 5 shown has two other such recesses 18 (not shown) disposed diametrically opposite those shown in the drawing, (i.e. four recesses 18 per spacer) so that there will be no solid metal across the gap 19 in the same radial planes as plates 6, 8 and plates 15, 16. Thus the radial gaps 19 extend around the full circumference of the gear between plate members 6 and 8 on one side and plate members 15, 16 on the other side. Although there is no metal-to-metal connections in a direct radial line between hub 1 and rim 3, it will be observed that the spacer members 5 connect the outer plates and the inner plates together through the central portion of the spacer member. Due to the keyhole shaped recess 18 the pipe spacers 5 provide a limited amount of radial resiliency between inner and outer plates, while at the same time serving to connect the plates for transmission of torque.

The operation of the invention will be apparent from the following description.

Vibrational energy waves generated by the meshing gear teeth 4 can take several possible paths from the rim 3 to hub 1. One typical path is indicated by line or arrows commencing at 20a following a tortuous path radially through plate 6, circumferentially and axially along the pipe spacer 5 between recesses 18, axially and circumferentially back along pipe spacer 5, and thence radially through plate 8 to the hub 1. Another possible path of sound energy transmission is indicated by the series of arrows commencing at 20b and includes a minor amount of energy transmitted through the bolts 11, radially through plate 10, and back through bolts 12 into plate 8, the major portion of this energy being absorbed by damping material 13.

It will be observed that radial separation of plate members 6, 8 will remove any direct metal-to-metal contact along a radial line and acts to reduce transmission of vibrational energy. It has been observed that radial separation of the plates improves performance primarily by way of attenuating high frequency vibrations. Addition of the damping plates 10, acts to effectively reduce lower frequency components without introducing a new path for high frequencies. Thus the disclosed web construction acts to attenuate a wide range of frequency components. Operating tests on an actual reduction gear for a turbine-generator with a web fabricated substantially as shown resulted in a reduction of energy by a factor of 25 decibels or a factor of 316 to 1 at normal operating frequencies.

Although the fabricated web structure disclosed includes two sets of cooperating plate members, it will be apparent that a single set of plate members would function in a similar manner for a single web gear rather than the double web gear shown. However, the preferred embodiment offers economical construction by using the pipe spacers as a common connecting means for both sets of plates.

Various other modifications will occur to those skilled in the art, and it is desired to cover in the appended claims all such modifications as fall within the true spirit and scope of the invention.

What we claim as new and desire to secure by Letters Patent of the United States is:

1. A quiet gear comprising:
 a rotatable gear hub,
 a toothed gear rim coaxial with and radially spaced from said hub,
 web means disposed between the rim and the hub, said web means including substantially aligned inner and outer radial plates connected to the hub and rim respectively and radially spaced from one another by an annular gap around the entire gear and also including means connecting the inner plate to the outer plate for transmission of torque at circumferentially spaced locations around the gear, said connecting means being arranged to bridge the gap between the inner and outer plates at a location outside of said gap in order to attenuate transmission of energy across the gap.

2. The combination according to claim 1 including a damping member carried by the gear and having damping material thereon disposed in rubbing contact with the inner and outer plates in order to further attenuate transmission of energy across the gap.

3. A quiet gear comprising:
 a rotatable gear hub,
 a toothed gear rim coaxial with and radially spaced from said hub,
 web means disposed between the rim and the hub including inner and outer radial plates connected to the hub and rim respectively and radially spaced from one another around the entire gear to define an annular gap,
 first energy-attenuating means comprising radially resilient metal members joining the plates together for torque transmission and bridging the gap at circumferentially spaced locations outside of said gap, and
 second energy-attenuating means including a radial plate portion bridging the gap and loosely connected to the inner and outer plates and having a damping material thereon disposed in rubbing contact with radial surfaces of both inner and outer plates.

4. A quiet gear comprising:
 a rotatable gear hub,
 a toother gear rim coaxial with and radially spaced from said hub,
 a pair of axially spaced inner radial plates connected to said hub and extending radially outward toward the rim,
 a pair of axially spaced outer radial plates connected to the rim and extending radially inward toward the hub,
 said inner and outer plates defining an annular gap therebetween around the gear,
 a plurality of cylindrical spacer members circumferentially spaced about the gear between the rim and hub, each being rigidly connected at each of its opposite ends to both an inner and outer plate, said spacer members defining recesses in the vicinity of the gap to attenuate vibrational energy transmission from the rim to the hub.

5. The combination according to claim 4 including first and second damping plates, each being loosely connected between an inner and outer radial plate and having damping material disposed thereon in rubbing relation with surfaces on the inner and outer plates to further attenuate transmission of sound between rim and hub of the gear.

References Cited by the Examiner
UNITED STATES PATENTS 2,961,856  11/1960  Selzer _____ 74—443 X

References Cited by the Applicant
UNITED STATES PATENTS 52,986  3/1866  Fryer et al.
2,380,776  7/1945  Miller.
2,399,122  4/1946  Johnson.
2,939,331  6/1960  Weeks.

DAVID J. WILLIAMOWSKY, *Primary Examiner.*

L. H. GERIN, *Assistant Examiner.*